United States Patent Office 3,704,248
Patented Nov. 28, 1972

3,704,248
ZEARALENONE REDUCTION
Edward B. Hodge, Terre Haute, Ind., assignor to Commercial Solvents Corporation
No Drawing. Filed Apr. 2, 1970, Ser. No. 25,266
Int. Cl. C07d 9/00
U.S. Cl. 260—343.2 F    5 Claims

ABSTRACT OF THE DISCLOSURE

A method for reducing zearalenone to zearalanol using a Raney nickel catalyst wherein the ratio of the low melting diastereoisomer to the high melting point diastereoisomer of zearalanol in the product is increased. Zearalenone is catalytically reduced with hydrogen and in the presence of a lower alkanol which is substantially anhydrous and a strong base.

---

This invention relates to a method for reducing zearalenone to a mixture of the high- and low-melting point diastereoisomers of zearalanol.

The terms "zearalenone" and "zearalanol" conform with the nomenclature in an article in Tetrahedron Letters, Pergamon Press, Ltd., No. 27, pp. 3109–3114 (1966).

When zearalenone, having the formula

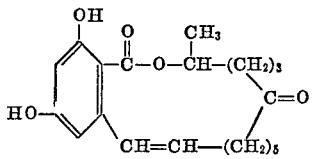

is converted to zearalanol, having the formula

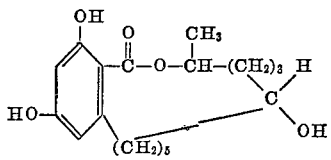

by reduction of the olefinic bond and the ketone group in the presence of hydrogen, a mixture of diastereoisomers of zearalanol is formed. This reduction, carried out in the presence of a Raney nickel catalyst, is disclosed in United States Patent No. 3,239,345. The diastereoisomers differ in melting point. The disclosd reduction provides an approximately 55:45 ratio of the high-melting point to the low-melting point diastereoisomer. The reduction, when carried out in the presence of an aqueous base, as disclosed in the aforesaid Tetrahedron Letters article, changes the ratio of the diastereoisomers obtained to about 35:65 of the high melting point to the low melting point diastereoisomer. The product can be separated utilizing a procedure disclosed in Examples I and II of copending application Serial No. 643,819, now U.S. Patent No. 3,574,235 filed June 6, 1967, in the name of Vernon V. Young. Both diastereoisomers of zearalanol are useful as anabolic and esterogenic substances for oral and parenteral administration to animals in the manner disclosed in United States Patent No. 3,239,345.

A method has now been found for catalytically reducing zearalenone using Raney nickel catalyst wherein the ratio of the diastereoisomer of zearalanol having the lower melting point to diastereoisomer of zearalanol having the higher melting point is increased.

In accordance with the present invention, the reduction of zearalenone is conducted in the presence of a substantially anhydrous medium including lower alkanol, a strong base and Raney nickel catalyst to increase the ratio of the low melting point to high melting point products obtained to provide a major, e.g., 70 wt. percent or more, proportion of the low melting point diastereoisomer and a minor, e.g., 30 wt. percent or less, proportion of the high melting point diastereoisomer of zearalanol.

The zearalenone can be prepared and purified as described in Examples II and III of United States Patent No. 3,239,345. The zearalenone is advantageously suspended or dissolved in a lower alkanol, e.g., methanol, ethanol, propanol and the like, preferably those containing from 1 to 3 carbon atoms, particularly ethanol. The zearalenone and solvent can advantageously be present, in amounts of for example, from about 1 to 25 grams zearalenone per 100 cc. of the solvent. The strong base (i.e., a base that is practically completely ionized in solution) can be an organic or inorganic base and suitable bases of this type include sodium hydroxide, potassium hydroxide, calcium hydroxide, quaternary ammonium hydroxide bases and the like. The strong base is advantageously employed in amounts in excess, e.g., about 10 weight percent excess or more of the equivalent weight for zearalenone and these amounts can generally range from about 0.1 to 8 grams of the base per 100 cc. of the lower alkanol. The strong base can be added to the lower alkanol in the form of pellets. The Raney nickel catalyst is employed in a catalytically-effective amount sufficient to promote reduction of the zearalenone and can be supported, for instance, on charcoal or kieselguhr. The catalyst is generally employed in a catalyst to zearalenone weight ratio of from about 0.1:1 to 5:1.

The reduction medium including the zearalenone, lower alkanol, strong base and Raney nickel is substantially anhydrous in that it is essentially composed of the lower alkanol as distinguished from the essentially aqueous medium disclosed in the aforesaid Tetrahedron Letters article. It may contain small amounts of water, generally not more than about 5 volume percent, usually not more than about 2 volume percent, based on the lower alkanol.

The zearalenone is reduced in the reduction medium with hydrogen under reducing conditions for a time sufficient to reduce substantially all of the zearalenone. Generally, the reduction can be carried out at a temperature of from about 15 to 100° C., preferably 20 to 60° C., with a hydrogen pressure generally from about 20 to 1000 p.s.i., preferably 25 to 100 p.s.i., generally for about 3 to 5 hours. After the reduction, Raney nickel catalyst is removed from the reaction mixture, e.g., by filtration, and the resulting mixture can be acidified with a concentrated acid, e.g. 35 to 40% hydrochloric acid, diluted with water, e.g., with about 2 to 5 volumes of water per volume of reaction mixture and cooled for a time sufficient to precipitate the zearalanol, which can be, for example, about 6 to 10 hours. Filtration of the cooled mixture yields the white crystals of zearalanol containing a major amount of the low melting diastereoisomer and minor amount of the high melting diastereosiomer which can be separated as noted above.

The invention shall be further described with reference to the following examples.

EXAMPLE I

Five grams of zearalenone in 150 cc. ethanol were reduced at room temperature for 4 hours at 50 p.s.i. hydrogen pressure in an Adams reducing apparatus after adding 5 g. of a thick suspension of Raney nickel in water (~50% metal). Before the start of the reduction, 3 g. of sodium hydroxide pellets were added. After the reduction, the reaction mixture was filtered to remove the Raney nickel and the filtrate was acidified with 37% hydrochloric acid. Then, 500 ml. of water were added slowly and the mixture was cooled overnight in the refrigerator. Filtration of the cooled mixture gave 4.65 g. of white crystals of zearalanol which analyzed about 90% of the low melting point diastereoisomer and about 10% of the high melting point diastereoisomer.

A reduction was carried out for comparative purposes in the same manner as Example I except that water was used instead of ethanol to show the advantage provided by using a medium which is essentially an alcoholic medium over an aqueous medium. After reduction, 300 ml. of water were added and the solution acidified with 37% hydrochloric acid, stirred for 30 minutes and filtered. The precipitate was washed with water to remove most of the entrapped sodium chloride. Recovery was 5.22 g. Analysis showed that this zearalanol contained about 65% of the low melting diastereoisomer and 35% of the high melting diastereoisomer.

EXAMPLES II and III

The following examples are conducted in essentially the same manner as employed in Example I except the lower alkanol and strong bases set forth for the given example are used:

| Example | Lower alkanol | Strong base |
|---|---|---|
| II | Methanol | Potassium hydroxide. |
| III | Propanol | Calcium hydroxide. |

It is claimed:

1. A method for reducing zearalenone to zearalanol wherein a mixture of the low melting point diastereoisomer and the high melting diastereoisomer of zearalanol are produced comprising catalytically reducing the zearalenone with hydrogen under reducing conditions in a medium consisting essentially of a lower alkanol in an amount sufficient to dissolve the zearalenone, a strong base in an amount in excess of the equivalent weight of the base for the zearalenone, and catalytic amounts of a Raney nickel catalyst to increase the proportion of the low melting diastereoisomer produced.

2. The method of claim 1 wherein the reducing conditions include temperatures from about 15 to 100° C. and a hydrogen pressure from about 20 to 1000 p.s.i., the catalyst is employed in a catalyst to zearalenone weight ratio from about 0.1:1 to 5:1 and the amount of the strong base is from about 0.1 to 8 grams per 100 cc. of the lower alkanol.

3. The method of claim 2 wherein the strong base is selected from the group consisting of sodium hydroxide, potassium hydroxide and calcium hydroxide and the lower alkanol contains from 1 to 3 carbon atoms.

4. The method of claim 2 wherein the lower alkanol is ethanol, the strong base is sodium hydroxide, and the zearalenone is employed in an amount of about 1 to 25 grams per 100 cc. of the lower alkanol.

5. The method of claim 4 wherein the reducing conditions include temperatures from about 20 to 60° C., and a hydrogen pressure from about 25 to 100 p.s.i. and a mixture of the diastereoisomers is produced containing 70 weight percent or more of the diastereoisomer having the lower melting point and 30 weight percent or less of the diastereoisomer having the higher melting point.

References Cited

UNITED STATES PATENTS 3,239,345   3/1966   Hodge et al. ____ 260—343.2 X

OTHER REFERENCES

Urry et al.: Tetrahedron Letters, pp. 3109–14 (1966).

JOHN M. FORD, Primary Examiner

UNITED STATES PATENT OFFICE
CERTIFICATE OF CORRECTION

Patent No. 3,704,248     Dated November 28, 1972

Inventor(s) EDWARD B. HODGE

It is certified that error appears in the above-identified patent and that said Letters Patent are hereby corrected as shown below:

Page 1, column 1, the formula reads

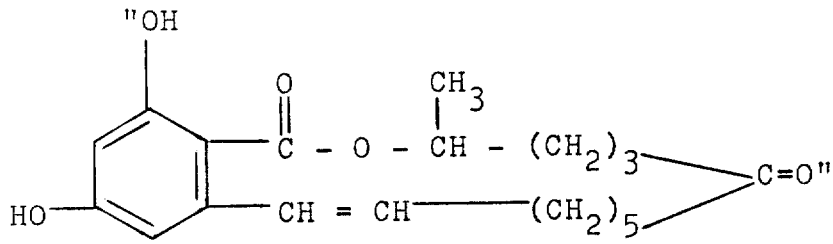

This formula should read

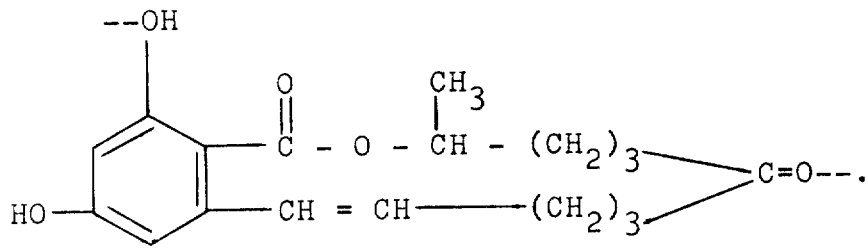

Signed and sealed this 10th day of April 1973.

(SEAL)
Attest:

EDWARD M. FLETCHER, JR.　　　　　ROBERT GOTTSCHALK
Attesting Officer　　　　　　　　Commissioner of Patents